April 15, 1958 A. M. DEITERS 2,830,629
WOODWORKING MACHINE PROVIDED WITH MEANS FOR AUTOMATICALLY
POSITIONING ITS PLANER HEAD, RESPONSIVE TO DIMENSIONAL
VARIATIONS IN WORK PIECES
Filed Sept. 28, 1956 3 Sheets-Sheet 1

INVENTOR.
A. M. DEITERS
BY
Adams + Bush
ATTORNEY

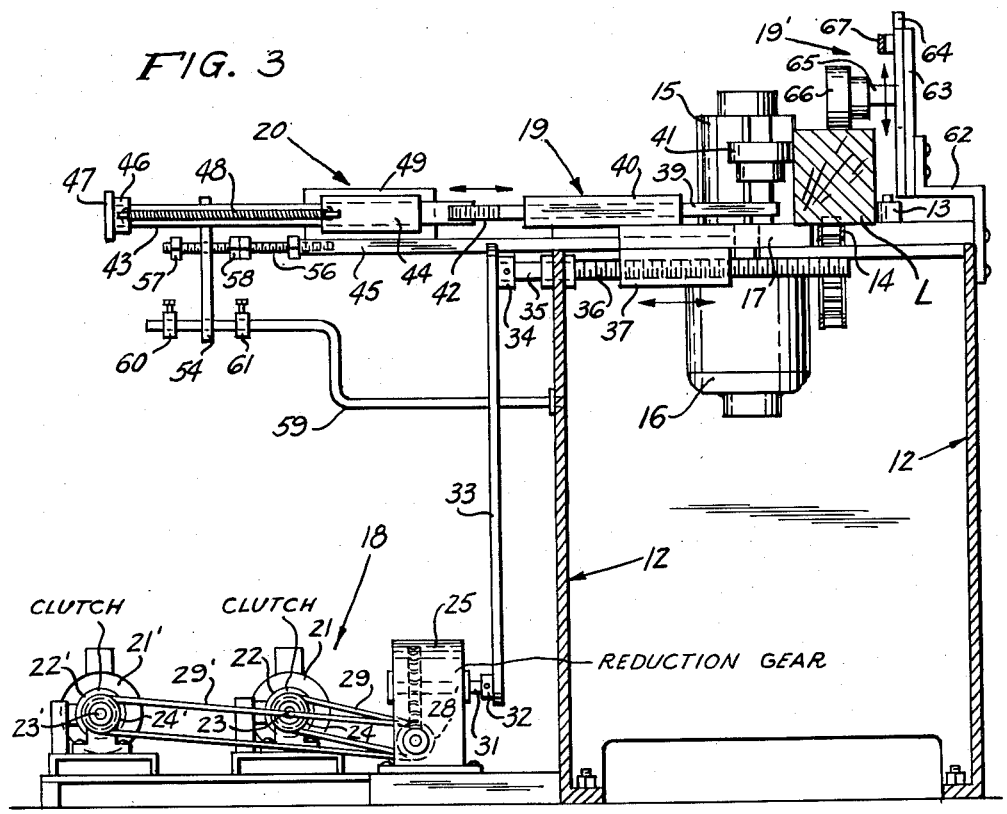
FIG. 3
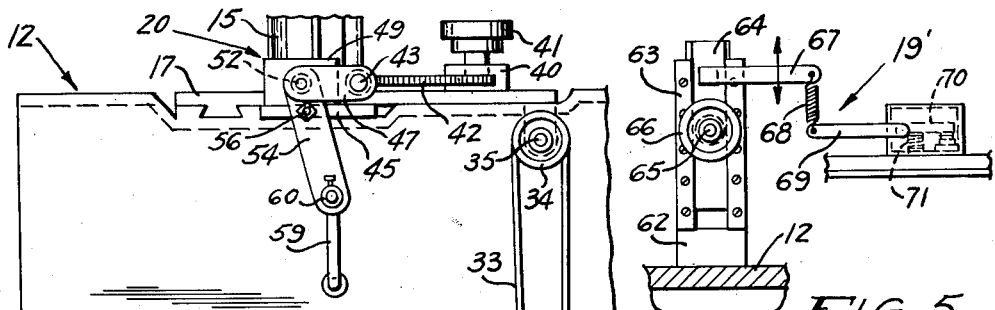
FIG. 4
FIG. 5
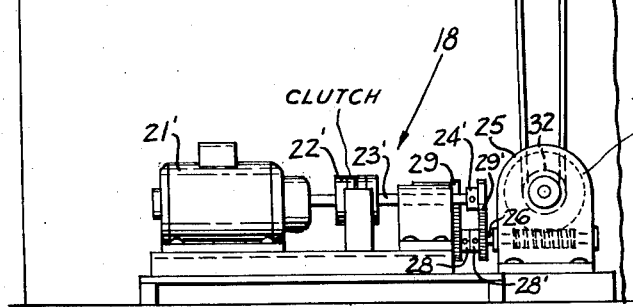
INVENTOR.
A. M. DEITERS
BY
Adams + Bush
ATTORNEY April 15, 1958  A. M. DEITERS  2,830,629
WOODWORKING MACHINE PROVIDED WITH MEANS FOR AUTOMATICALLY
POSITIONING ITS PLANER HEAD, RESPONSIVE TO DIMENSIONAL
VARIATIONS IN WORK PIECES
Filed Sept. 28, 1956  3 Sheets-Sheet 3
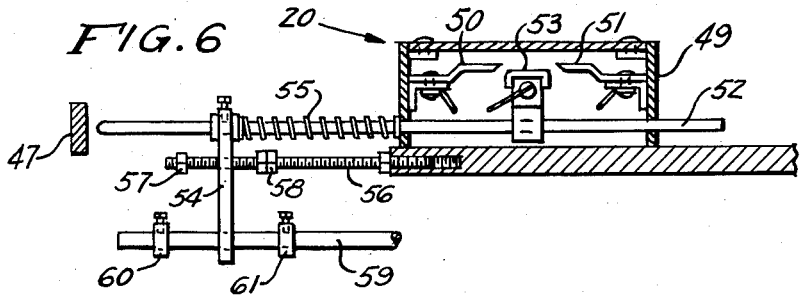
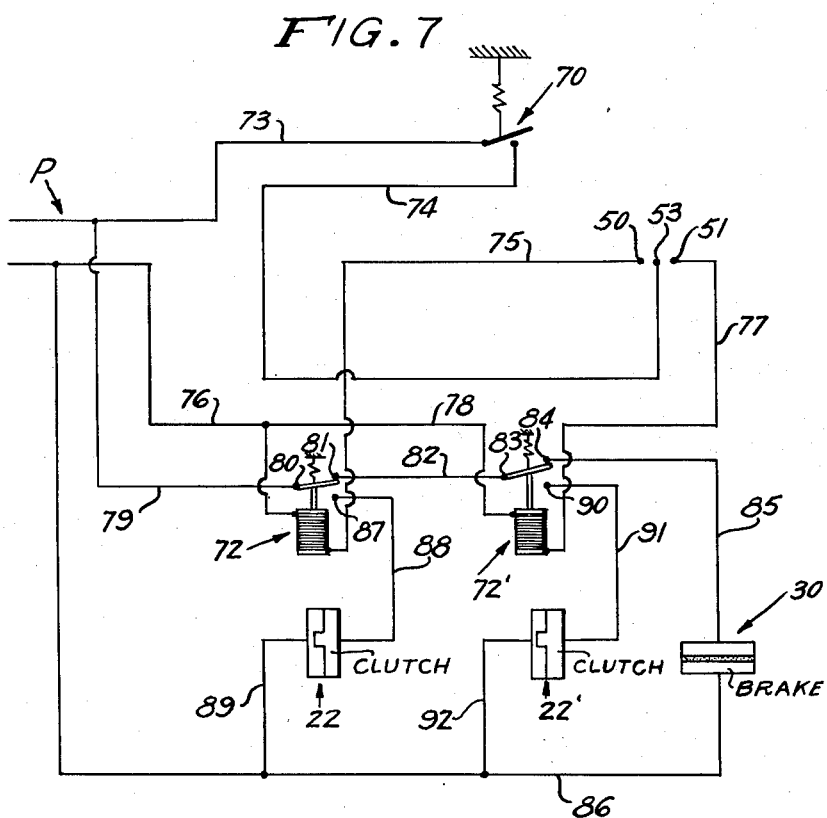
INVENTOR.
A.M. DEITERS
BY
Adams + Bush
ATTORNEY

United States Patent Office 2,830,629
Patented Apr. 15, 1958

2,830,629

WOODWORKING MACHINE PROVIDED WITH MEANS FOR AUTOMATICALLY POSITIONING ITS PLANER HEAD, RESPONSIVE TO DIMENSIONAL VARIATIONS IN WORK PIECES

August Matthias Deiters, Atlanta, Ga., assignor to Southern Wood Preserving Company, Atlanta, Ga., a corporation of Georgia Application September 28, 1956, Serial No. 612,711

14 Claims. (Cl. 144—117)

This invention relates to wood working machines and has more particular reference to a machine for dressing the edges of lumber strips of different and varying widths.

One object of the present invention is to provide in a planer novel and improved apparatus for automatically adjusting the cutter head to cause the cutter head to smooth or dress a surface of a board or strip of lumber just below the rough size, even though the rough size may vary substantially.

Another object of the invention is to provide apparatus, as characterized above, including means for automatically moving the cutter head toward and from the path of travel of the lumber through the planer in response to variations in the dimensions between the surface to be dressed and the opposite surface of the lumber as determined by a detecting device including a detecting member resiliently held in engagement with the surface to be dressed of the lumber as it moves through the planer.

Another object of the present invention is to provide apparatus, as characterized above, including means for adjusting the cutter head so that it will cut to a predetermined depth, thereby permitting the planer to be employed for bringing a strip of lumber size.

A further object of the invention is to provide apparatus, as characterized above, which is simple and rugged in construction, efficient in operation, and readily adaptable to most types of planers.

Other objects and advantages of the invention will appear in the following specification when considered in connection with the accompanying drawings, wherein:

Fig. 3 is a vertical sectional view taken on the line 3—3 of Fig. 1, looking in the direction of the arrows;

Fig. 4 is a front elevational view of the apparatus shown in Fig. 3;

Fig. 5 is a vertical sectional view taken on the line 5—5 of Fig. 1, and looking in the direction of the arrows;

Fig. 6 is a vertical sectional view taken on the line 6—6 of Fig. 1; and

Fig. 7 is a diagrammatic illustration of the wiring for controlling the apparatus.

The present invention provides novel and improved apparatus for automatically controlling the cutter head of a planer to cause the cutter head to smooth or dress a surface of the strip of lumber just below the rough size, even though the rough size may vary substantially and, in general, comprises an attachment for automatically moving the cutter head toward and from the path of travel of the lumber through the planer in response to variations in the dimension between the surface to be dressed and the opposite surface of the lumber as determined by a feeler member which is resiliently held in engagement with the surface to be dressed of the lumber as it moves through the planer.

While the apparatus of the present invention may be employed to automatically control the movement of a cutter head for dressing the top surface of a strip of lumber, it is particularly adaptable to control the cutter head for dressing an edge of a strip of lumber and, for the purpose of illustration, it will be shown and described as employed to automatically control a cutter head for dressing a side edge of a strip of lumber.

Figure 1:
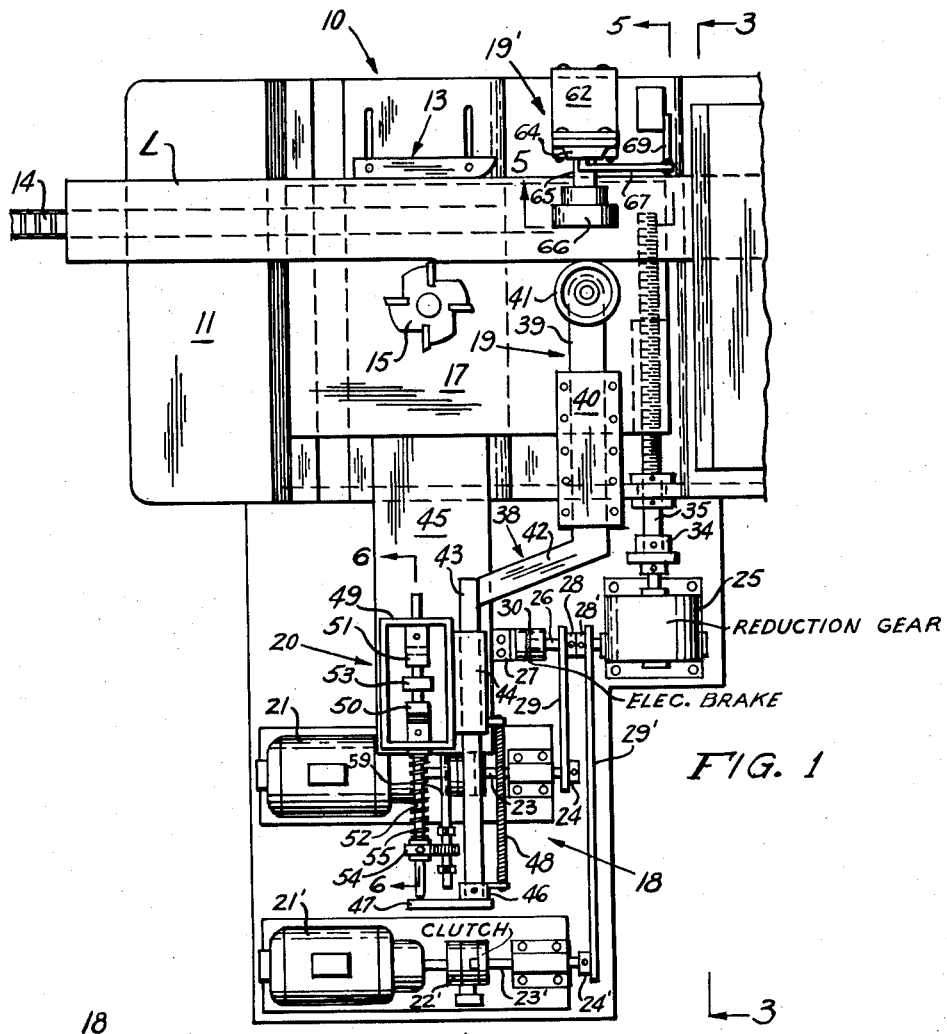
Fig. 1 is a plan view of a planer having one embodiment of a device constructed in accordance with the present invention mounted thereon for controlling the movement of the cutter head in response to variations in the width of the lumber being treated.
Figure 2:
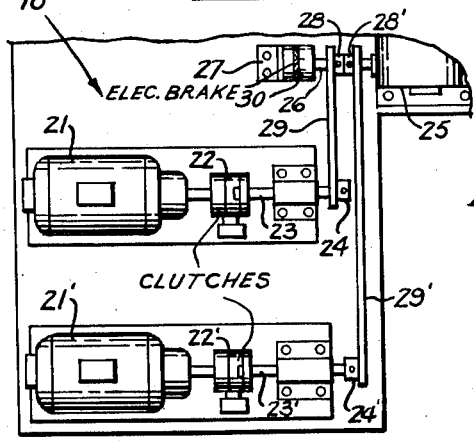
Fig. 2 is a fragmentary plan view showing a clearer view of some of the apparatus shown in Fig. 1.

Referring now to the drawings, there is illustrated, in Figs. 1, 2 and 3, a planer or edge cutting machine embodying the improvements of the present invention.

The planer, indicated generally at 10, and which may be of any suitable usual type, is shown as comprising a bed 11, over which the strip of lumber being dressed passes, supported by a suitable framework 12, an adjustable guide 13 mounted on the bed 11 a work feed chain conveyor 14 for moving the lumber through the machine, a rotary cutter head 15, driven by a motor 16, carried by a carrier member or platform 17 slidably mounted on the bed 11 for movement toward and from the path of travel of the lumber through the machine.

The apparatus for automatically moving the cutter head toward and from the path of travel of the strip of lumber L through the machine in response to variations in the width of the strip of lumber is shown as comprising driving means, indicated generally at 18, for moving the platform 17 carrying the cutter head 15 toward and from the path of travel of the lumber through the machine, a detecting device, indicated generally at 19, for continuously detecting any changes in the width of the strip of lumber as it passes through the machine; a control device, indicated generally at 20, for controlling the operation of the driving means 18 in response to actuation by the detecting device 19; and a second detecting device, indicated generally at 19', for detecting the presence of strips of lumber as they pass through the machine and stopping the operation of the driving means 18 upon the absence of any lumber engaged by the detecting device 19.

The driving means, indicated generally at 18, for moving the platform 17 carrying the cutter head 15 toward and from the path of travel of the strip of lumber being dressed through the machine, is shown as comprising a pair of electric motors 21, 21' having their respective armature shafts connected by electric clutches 22, 22', to drive shafts 23, 23', which carry pulleys 24, 24' respectively; a reduction gearing 25 including an input shaft 26 having its outer end journaled in a suitable bearing 27 and carrying a spaced pair of pulleys 28, 28' connected to be driven by pulleys 24, 24', by belts 29, 29', respectively; an electrical brake 30 for controlling the rotation of the shaft 26; and an output shaft 31 carrying a pulley 32 connected by a belt 33 to a pulley 34 fixedly mounted on a screw shaft 35 journaled in a suitable bearing carried by the frame 12 and having a threaded portion 36 extending through an internally threaded collar or sleeve 37 carried by the platform 17.

The motors 21, 21', are identical in construction; however, their fields are so connected that they run in opposite directions. When the planer is in use, both motors are normally kept running and the electric brake is normally kept "on." Thus, for example, if the electric clutch 22 of motor 21 is energized to connect the armature shaft of the motor and the pulley shaft 23, and simultaneously, the brake 30 is deenergized, the motor will operate, through the reduction gearing 25, to turn the screw shaft 35 in a direction to cause the platform 17 carrying the cutter head 15 to linearly move away from the path of travel of the strip of lumber through the machine. In the same manner, if the electric clutch 22′ of the motor 21′ is energized and, simultaneously, the electric brake 30 is deenergized, the motor 21′ will operate, through the reduction gearing 25, to turn the shaft 35 in a direction to cause the platform 17 and the cutter head 15 to be moved toward the path of travel of the strip of lumber through the machine.

The detecting device 19 for continuously detecting any changes in the width of the strip of lumber being trimmed or the difference in initial width of successive strips of lumber to be trimmed as they pass through the machine, is shown as comprising an offset shaped slide member 38 having a rectangular in-cross-section inner leg 39 slidably mounted in a guide 40 fixedly mounted on the platform 17 adjacent the cutter head 15 and carrying an idle roller 41 mounted on its inner end for rotation about a vertical axis and in position to engage the edge to be trimmed of the strip of lumber as it passes through the machine, a rectangular in-cross-section connecting member 42 rigidly connecting the inner leg 39 to a rod shaped outer leg 43 slidably mounted in a guide member 44 fixedly mounted on an extension plate 45 carried by the platform 17. A collar 46 carrying a laterally extending actuating bar or arm 47 is adjustably mounted on the outer end portion of the rod 43 and a coiled spring 48 having one end connected to the collar 46 on the rod 43 and its other end connected to a lug on the guide member 44, normally resiliently holds the roller 41 in engagement with the strip of lumber as it passes through the machine.

The control device 20 for controlling the operation of the driving means 18 in response to actuation by the detecting device 19, is shown as comprising a switch box 49 fixedly mounted on the extension plate 45 carried by the platform 17 and carrying electrical switch contacts 50, 51 mounted on its end walls, and a contact rod 52 slidably mounted in and extending through the end walls of the switch box and carrying a switch contact 53 positioned intermediate the contacts 50, 51 and adapted to be moved into engagement with either of these contacts as the rod 52 moves back and forth. A laterally extending guide and stop bar or arm 54 is adjustably mounted on the outer end portion of the rod 52 and a coiled compression spring 55 mounted on the rod between the arm 54 and the outer end of the switch box 49, normally maintains the end of the rod 52 pressed against the actuating arm 47 carried by the rod 43, with the spring partially compressed and with the switch contact 53 positioned intermediate the contacts 50 and 51 carried by the switch box 49.

A threaded guide pin 56, carried by the extension plate 45, extends through an opening formed in the guide and stop arm 54 and carries adjustable stop members 57, 58 positioned on opposite sides of the arm 54 to adjustably limit the movement of the rod 52 so that the switch contact 53 will never become wedged under either of the stationary contacts 50, 51.

An offset shaped rod 59 having its inner end fixedly attached to the frame 12, extends through an opening formed in the lower end portion of the guide and stop arm 54 and carries adjustable stop members 60, 61 positioned on opposite sides of the arm 54 to hold the linear movement of the cutter head within any limits that may be desired.

The contacts 50, 51 and the switch contact 53 are connected in an electrical circuit which controls, through suitable relays, the operation of the electric clutches 22, 22′ and the electric brake 30 in a manner hereinafter to be described.

The detecting device 19′ for detecting the presence or absence of lumber passing through the machine and preventing any movement of the cutter head when no lumber is present, is shown as comprising a bracket 62 fixedly mounted on the frame 12 and carrying a vertical guide 63 in which is slidably mounted for up and down movement, a block 64 carrying a laterally projecting stub shaft 65 on which is mounted an idle roller 66. The block 64 also carries a laterally projecting arm 67 having its outer end connected to a coiled spring 68 which, in turn, is connected to a pivoted lever 69 which operates a switch 70 connected in the circuit which controls the operation of the electric clutches 22, 22′ and the electric brake 30. A coiled spring 71 normally maintains the switch 70 open and, when the roller 66 is raised, due to engagement with a piece of lumber, the arm 67, through spring 68, raises the pivoted lever 69 to close the switch. Whenever lumber is absent from the machine, the spring 71 opens the switch.

As shown, the roller 66 of the detecting device 19′ is positioned in horizontal alignment with the roller 41 of the detecting device 19, so that, as soon as a strip of lumber has passed out of engagement with the roller 41, the detecting device 19′ will operate to cut out the two electric clutches 22, 22′ and thereby prevent any further movement of the cutter head.

In Fig. 7, there is diagrammatically illustrated a wiring diagram showing the manner in which the control device 20 and the detecting device 19′ control the operation of the electric clutches 22, 22′ and the electric brake 30, by means of relays 72, 72′ associated with the clutches 22, 22′, respectively.

The circuit for operating the relay 72 may be traced from the 20 to 90 volt supply line P through wire 73 to switch 70 of the detecting device 19′, from switch 70 through wire 74 to the movable switch contact 53 of the control device 20, from the stationary contact 50 of control device 20 through wire 75 to the solenoid of relay 72 and from the solenoid of relay 72 through wire 76 back to the supply line P.

The circuit for operating relay 72′ may be traced from the supply line P through wire 73 to switch 70 of the detecting device 19′, from switch 70 through wire 74 to switch contact 53 of the control device 20, from stationary contact 51 of the control device 20 through wire 77 to the solenoid of relay 72′, and from the solenoid of relay 72′, through wires 78 and 76, back to the supply line P.

The circuit for operating the electric brake 30 may be traced from the supply line P through wire 79 to contact 80 of the switch of relay 72, from contact 81 of the switch of relay 72 through wire 82 to contact 83 of the switch of relay 72′, from contact 84 of the switch of relay 72′ through wire 85 to the electric brake 30, from the electric brake 30 through wire 86 back to the supply line P.

The circuit for operating the electric clutch 22 may be traced from supply line P through wire 79 to contact 80 of the switch of relay 72, from contact 87 of the switch of relay 72, through wire 88 to the electric clutch 22, from the electric clutch 22, through wires 89 and 86, back to supply line P.

The circuit for operating the electric clutch 22′ may be traced from the supply line P through wire 79 to contact 80 of the switch of relay 72, from contact 81 of the switch of relay 72 through wire 82 to contact 83 of the switch of relay 72′, from contact 90 of the switch of relay 72′, through wire 91 to the electric clutch 22′, from electric clutch 22′, through wires 92 and 86, back to the supply line P.

The relays 72 and 72′ normally maintain the circuits to the two electric clutches 22, 22′, open and the circuit to the electric brake 30 closed.

The switch 70 remains open as long as there is no lumber passing through the machine. However, as soon as the roller 66 is raised by a strip of lumber the switch 70 is closed. The control circuits for the relays 72, 72′ are normally maintained open as the switch contact 53 of the control device is normally maintained between the contacts 50, 51. However, when the switch contact 53 is moved to engage the contact 50, the circuit to the solenoid of relay 72 is energized and the relay is operated to open the circuit to the electric brake and close the circuit to the clutch 22 of motor 21. When the switch contact 53 is moved out of engagement with the contact 50, the relay 72 is operated to open the circuit to the electric clutch 22 and close the circuit to the electric brake 30.

In like manner, whenever the switch contact 53 is moved to engage the contact 51, the circuit to the solenoid of relay 72' is energized and the relay is operated to open the circuit to the electric brake 30 and close the circuit to the electric clutch 22' of the motor 21'. When the switch contact 53 is moved out of engagement with the contact 51, the relay 72' is operated to open the circuit to the electric clutch 22' and close the circuit to the electric brake 30.

From the foregoing, the operation of the apparatus is believed apparent. Whenever a strip of lumber is received on the table, it will engage and raise the roller 66 of the detecting device 19', thereby closing switch 70 in the control circuit to the relays 72, 72'.

The roller 41 of the detecting device 19 engages the outer edge of the strip of lumber as it passes through the machine, and, as the width of the strip of lumber varies as it passes through the machine, the roller 41 will be given a linear movement toward and from the path of travel of the strip of lumber through the machine and will cause, through the control device 20 and driving means 18, a corresponding follow-up movement of the platform 17 and with it the cutter head 15 toward and from the path of travel of the strip of lumber through the machine; the movement of the platform 17 and with it the cutter head, being stopped as soon as it has effected a linear movement commensurate with the linear movement of the roller 41 toward or from the path of travel of the strip of lumber through the machine. For example, assume that the width of the strip of lumber increased ¼", the roller 41 would be moved outwardly ¼", causing the actuating bar 47 to be moved outwardly ¼" against the pull of spring 48. Immediately, the compressed spring 55 mounted on the contact rod 52 would cause the contact rod to move outwardly, bringing the switch contact 53 into engagement with the contact 50 on the switch box 49. This would result in opening the circuit to the electric brake 30 and closing the circuit to the electric clutch 22 of motor 21, and the motor, through the reduction gearing 25, would operate the screw shaft 35 to impart linear movement to the platform 17 and cutter head 15 away from the path of travel of the strip of lumber through the machine. As the platform 17 moves outwardly, the extension plate 45 carrying the switch box 49 moves outwardly, and such movement would continue until the outer end of the contact rod 52 engaged the actuating bar 47. This outward movement would continue until the actuating bar forced the contact rod inwardly, compressing the compression spring 55 and moving the switch contact 53 out of engagement with the contact 50, thereby opening the circuit to the electric clutch 22 and closing the circuit to the electric brake 30 and stopping the movement of the platform 17 and the cutter head. Any additional increase in the width of the strip of lumber would result in a similar and commensurate outward movement of the cutter head until the guide and stop arm 54 engaged the stop member 60 carried by the offset shaped rod 59.

In like manner, assume the width of the strip of lumber decreased ¼"; the pull of spring 48 would cause the roller 41 to be moved inwardly ¼", causing the actuating bar 47 to be moved inwardly ¼". The actuating bar would move the contact rod 52 inwardly, further compressing the spring 55 and bringing the switch contact 53 into engagement with contact 51 of the switch box 49. This would result in opening the circuit to the electric brake 30 and closing the circuit to the electric clutch 22' of motor 21' and the motor, through the reduction gearing 25, would operate the screw shaft 35 to impart linear movement to the platform 17 and cutter head 15 toward the path of travel of the strip of lumber through the machine. As the platform 17 moved inwardly, the extension plate 45 carrying the switch box 49 would move inwardly and such movement would continue until the compression spring 55, which holds the contact rod 52 against the actuating bar 47, has been relieved sufficiently to permit the contact 51 of the switch box to move inwardly out of engagement with the switch contact 53, thereby opening the circuit to the electric clutch 22' and closing the circuit to the electric brake 30 and stopping the movement of the platform 17 and cutter head 15. Any additional decrease in the width of the strip of lumber would result in a similar and commensurate inward movement of the cutter head until the guide and stop arm 54 engaged the stop member 61 carried by the offset shaped rod 59.

The depth of the cut made in the side edge of the strip of lumber is determined by the relative position of the cutter head with respect to the path of travel of the strip of lumber through the machine and this position can be adjusted within the limits set by the stop members 60, 61 mounted on the rod 59 by adjusting the longitudinal position of the actuating bar 47 on the rod portion 43 of the positioning lever 38 carrying the roller 41.

Obviously, the detecting device 19 will automatically position the cutter head to properly dress strips of lumber of different widths as they successively pass through the machine.

From the foregoing, it is readily apparent that there has been provided in a planer or edge trimming machine, novel and improved apparatus for automatically moving the cutter head toward and from the path of travel of a strip of lumber passing through the machine, in response to variation in the width of the strip of lumber or variations in the widths of successive strips of lumber, so that the edge of the strip of lumber will be dressed just below the rough size of the strip throughout its length; apparatus which is simple and rugged in construction, and readily adaptable to most planers or edge trimmers.

While the invention has been described as employed to control the movement of a cutter head for dressing the side edge of a strip of lumber, obviously, it is equally adapted to be employed to control the movement of a cutter head for dressing the top surface of a strip of lumber. Also, as the cutter head may be controlled to cut to a predetermined depth, the apparatus may be employed to control the cutter head for bringing the lumber to size.

Obviously, the invention is not restricted to the particular embodiment thereof herein shown and described.

What is claimed is:

1. In a planer for dressing lumber of the type comprising a work support over which the strip of lumber passes to be dressed and a cutter head carried by a support member mounted on the work support for movement toward and from the path of travel of the strip of lumber through the machine so that the cutter head can be adjustably moved into cutting engagement with one surface of the strip of lumber, the improvement which comprises means for automatically controlling the movement of said cutter head support member toward and from the path of travel of the strip of lumber through the machine in response to variations in the dimensions of the strip of lumber, said means including an electrically operated device connected to move said support member toward and from said path of travel of said strip of lumber, a switch control device for controlling the operation of said electrically operated device, a detecting device including a detecting member resiliently held in engagement with the surface to be dressed of said strip of lumber as it moves through the machine for actuating said switch control device and thereby control movement of said electrically operated device so that said support member will be moved in a direction determined by the movement of said detecting member, and means including a member connecting said switch control device to said support member and operable when said support member has effected a movement commensurate with the movement of said detecting member to stop the operation of said electrically operated device, whereby the movement of said cutter head will be regulated in response to variations in the dimensions of said strip of lumber as it moves through said machine and thereby control the amount of material cut from the surface of said strip of lumber.

2. Apparatus as set forth in claim 1, including a second detecting device for detecting the presence or absence of a strip of lumber engaged by said first named detecting device and preventing any linear movement of said support member and cutter head whenever said first named detecting device is not engaging a strip of lumber.

3. In a planer for dressing lumber of the type comprising a work support over which the lumber passes through the machine and a movable cutter head mounted on the work support for movement toward and from the path of travel of the strip of lumber through the machine so that the cutter head can be adjustably moved into cutting engagement with the surface to be trimmed of the strip of lumber, the improvement which comprises means including a pair of electric motors for automatically moving the cutter head toward and from the surface to be trimmed of the lumber strip as it passes through the machine in response to variations in the dimensions between the surface to be dressed and the opposite surface of the strip of lumber as it passes through the machine; means including an electric clutch for connecting one of said motors to move said cutter head toward said path of travel of the strip of lumber through the planer; means including an electric clutch for connecting the other of said motors to move said cutter head away from the path of travel of the strip of lumber through the planer; a switch device connected in the electric circuits to the electric clutches; a detecting device for constantly detecting variations in the dimensions of the strip of lumber as it passes through the planer including a movable lever mounted for linear movement toward and from the path of travel of the strip of lumber through the planer and having means on its inner end positioned to engage the surface to be trimmed of the strip of lumber and resilient means normally holding the inner end of said lever in position against said surface to be trimmed of said strip of lumber, said lever having its outer end portion connected to actuate said switch device to close the respective circuits to the clutches in response to movement of said lever caused by variations in the dimensions of said strip of lumber as it moves through the planer; and a member rigidly connected at one end for linear movement with said cutter head and having its other end connected to operate said switch device to open any one of the circuits to the electric clutches closed by the movement of said detecting device as soon as the cutter head has effected a movement commensurate with the movement of said lever of said detecting device.

4. Apparatus as set forth in claim 3, including a second detecting device for detecting the presence or absence of a strip of lumber engaged by said first named detecting device and preventing any linear movement of said cutter head whenever said first named detecting device is not engaging a strip of lumber.

5. In apparatus for trimming the edge of a strip of lumber or the like, of the type comprising a work support over which the strip of lumber to be trimmed passes and a cutter head mounted on a carrier member mounted on the work support for movement toward and from the path of travel of the strip of lumber through the machine so that the cutter head can be adjustably moved into cutting engagement with an edge of the strip of lumber, the improvement which comprises means for automatically controlling the movement of said carrier member toward and from the path of travel of the strip of lumber through the machine in response to variations in the width of the strip of lumber, said means including an electrically operated device connected to move said carrier member toward and from said path of travel of said strip of lumber, a switch control device for controlling the operation of said electrically operated device, a detecting device including a roller resiliently held in engagement with the edge to be trimmed of said strip of lumber as it moves through the machine, for actuating said switch control device so that said carrier member will be moved in a direction determined by the movement of said roller, and means including a member connecting said switch device to said carrier member and operable when said carrier member has effected a movement commensurate with the movement of said roller to stop the operation of said electrically operated device, whereby the movement of said cutter head will be regulated in response to variations in the width of said strip of lumber as it moves through said machine and thereby control the amount of material trimmed from the edge of said strip of lumber.

6. Apparatus as set forth in claim 5, including a second detecting device for detecting the presence or absence of a strip of lumber engaged by said first named detecting device and preventing any linear movement of said carrier member and cutter head whenever said first named detecting device is not engaging a strip of lumber.

7. In a planer for trimming the edge of a strip of lumber or the like of the type comprising a work support over which the lumber passes through the planer and a movable cutter head mounted on the work support for movement toward and from the path of travel of said strip of lumber through the planer, the combination with said cutter head of means for automatically moving it toward and from the path of travel of the strip of lumber through the planer in response to variations in the width of the strip of lumber whereby the edge of the strip of lumber will be dressed just below the rough size of the strip throughout its length regardless of variations in its width, said means including a pair of electric motors; means including an electric clutch for connecting one of said motors to move said cutter head toward said path of travel of the strip of lumber through the planer; means including an electric clutch for connecting the other of said motors to move said cutter head away from the path of travel of the strip of lumber through the planer; a switch device connected in the electric circuits to said electric clutches; a detecting device for constantly detecting variations in the width of the strip of lumber as it passes through the planer including a movable lever mounted for linear movement toward and from the path of travel of the strip of lumber through the planer and having means on its inner end positioned to engage the edge to be trimmed of the strip of lumber and resilient means normally holding the inner end of said lever in position against the edge of said strip of lumber, said lever having its outer end portion connected to actuate said switch device to close the respective circuits to said clutches in response to movement of said lever caused by variations in the width of said strip of lumber as it moves through the planer; and a rigid member connected at one end for linear movement with said cutter head and having its other end connected to operate said switch device to open any one of the circuits of said electric clutches closed by the movement of said detecting device as soon as the cutter head has effected a movement commensurate with the movement of said lever of said detecting device.

8. Apparatus as set forth in claim 7, including a second detecting device for detecting the presence of a strip of lumber as it moves through the planer and stopping all linear movement of the cutter head when the strip of lumber moves out of engagement with said first named detecting device, said second detecting device including a vertical guide fixedly mounted in said work support, a block slidably mounted in said guide for up and down movement therein and carrying detecting means on its bottom end positioned to engage the upper surface of the strip of lumber as it moves through the machine; and a laterally projecting lever positioned to open a normally closed switch in the circuit to said clutches when no lumber is engaged by said first named detecting device.

9. Apparatus as set forth in claim 7, wherein said cutter head is fixedly mounted for rotation about a vertical axis on a carrier member slidably mounted on said work support for movement toward and from the path of travel of the strip of lumber through the planer; wherein said means for automatically moving the cutter head includes an internally threaded sleeve fixedly secured to said carrier member and having a screw shaft mounted in said sleeve for imparting linear movement thereto; and reduction gearing having an output shaft connected to rotate said screw shaft in either direction and an input shaft connected to be rotated in one direction by one of said motors and in the opposite direction by the other of said motors.

10. Apparatus as set forth in claim 9, including an electric brake mounted on the input shaft of said reduction gearing and having its circuit connected in the circuits to the electric clutches so that the circuit to the brake will be opened whenever the circuit to one of the clutches is closed and will be closed when both circuits to the clutches are open.

11. Apparatus as set forth in claim 7, wherein said cutter head is fixedly mounted for rotation about a vertical axis on a carrier member slidably mounted on said work support for movement toward and from the path of travel of the strip of lumber through the planer; wherein said switch device includes a spaced pair of electric contact members fixedly mounted on said rigid member connected for linear movement with said cutter head, a contact rod slidably mounted on said rigid member and carrying a switch contact point positioned to be moved into engagement with either of said electrical contact members, the outer of said electrical contact members being connected in the electric circuit to the clutch member operative to move the cutter head away from said path of travel of the strip of lumber through the machine, the inner of said electrical contact members being connected in the circuit to the clutch member operative to move the cutter head toward said path of travel and said switch contact point being connected in the electric circuits to each of the clutch members and a coiled compression spring normally urging said contact rod to move in an outward direction; and wherein said movable lever of said detecting device carries an actuating bar projecting laterally therefrom in position to engage the outer end of said contact rod for moving said contact rod inwardly when said lever moves inwardly.

12. Apparatus as set forth in claim 11, wherein said actuating bar is longitudinally adjustably mounted on said movable lever whereby the position of the cutter head relative to the position of the detecting means on the inner end of said movable lever can be adjusted to control the depth of the cut made in the edge of the strip of lumber.

13. Apparatus as set forth in claim 11, including a laterally projecting guide and stop arm longitudinally adjustably mounted on said contact rod in position to be engaged by the coiled compression spring mounted thereon and a guide pin carried by said rigid member and extending outwardly in sliding engagement through said guide and stop arm and carrying a longitudinally spaced pair of adjustable stop members positioned on opposite sides of said guide and stop arm to limit the movement of said contact rod so that the electrical switch contact thereon will not be jammed under either of the electric contact members fixedly mounted on said rigid member.

14. Apparatus as set forth in claim 11, including a laterally projecting guide and stop arm longitudinally adjustably mounted on said contact rod in position to be engaged by the coiled compression spring mounted thereon and a guide rod fixedly connected to the work support and extending outwardly in sliding engagement through said guide and stop arm and carrying a longitudinally spaced pair of adjustable stop members positioned on opposite sides of said guide and stop arm to limit the travel of said cutter head toward and from the path of travel of the strip of lumber through the planer.

References Cited in the file of this patent

UNITED STATES PATENTS

| | | |
|---|---|---|
| 1,316,051 | Linderman | Sept. 16, 1919 |
| 2,091,647 | Nicholson | Aug. 31, 1937 |
| 2,273,653 | Melby | Feb. 17, 1942 |
| 2,332,654 | Mead et al. | Oct. 26, 1943 |
| 2,473,461 | White | June 14, 1949 |
| 2,516,176 | Bjork | July 25, 1950 |
| 2,765,012 | Riddell et al. | Oct. 2, 1956 |
| 2,785,715 | Brundell et al. | Mar. 19, 1957 |